No. 754,298. Patented March 8, 1904.

UNITED STATES PATENT OFFICE.

GEORGE FRY, OF BERWICK-UPON-TWEED, ENGLAND.

PRODUCTION OF RESINOUS SUBSTANCES.

SPECIFICATION forming part of Letters Patent No. 754,298, dated March 8, 1904.

Application filed December 12, 1902. Serial No. 134,991. (No specimens.)

*To all whom it may concern:*

Be it known that I, GEORGE FRY, timber merchant, a subject of the King of Great Britain, residing at Carlin Brae, Berwick-upon-Tweed, England, have invented certain new and useful Improvements in and Relating to the Production of Resinous Substances, of which the following is a specification.

The well-known process by which colophony and oil of turpentine are derived from crude turpentine is typical of what occurs when any crude vegetable hydrocarbons or their derivatives are subjected to distillation, (with or without the addition of water.) The crude hydrocarbon will be called "turpentine," the distillate "oil of turpentine," the resinous residuum "colophony." Linseed-oil will be taken as the type of the drying-oils. Its natural form will be called "raw oil." When subjected to any process to render it more siccative it will be designated as "boiled oil." The nitric acid prescribed is a good commercial sample, practically free from impurities, and of about 1.420 specific gravity.

The varnishes described when spread in a thin film on a plain white surface are of a yellow color, inclining more or less toward orange or brown. This color will be called that of "transmission." When seen in bulk or when a ray of light passes obliquely through a layer or pellicle sufficiently thick to cause reflection, refraction, and polarization, a much deeper color is apparent, which will be called that of "refraction."

This invention consists, first, in the formation of a nitro compound caused by the action of nitric acid intimately mixed with turpentine, oil of turpentine, colophony, raw oil, or with suitable mixtures, combinations, or solutions of these various vegetable substances; second, in the decomposition of this nitro compound by a gentle heat, preferably that of a water-bath; third, in the modification of the substances produced by these two operations of nitrification and oxidation by the regulated action of heat.

To produce in the dry way from colophony a resin suitable for making varnish, one hundred parts (by weight) of colophony are reduced to fine powder in a porcelain mortar. Then ten to thirty parts (by volume) of nitric acid are kneaded into it drop by drop, the formation of lumps being avoided. The result is a granulated powder of a dark olive-green color, generally stable at ordinary atmospheric temperatures. This nitrocolophony is now introduced in small successive quantities into a porcelain basin over a boiling-water bath. It soon fuses, becomes brown, then begins to froth and emit vapor and gas. The resulting yellow resin may remain over the water-bath for sufficient time to drive off any residual water and then is suitable for turpentine, oil, or spirit varnish. If a deeper color or harder resin is desired, the resin may be allowed to cool, again pulverized, and the described processes repeated indefinitely. The color or hardness may be also increased by the action of heat, as will be hereinafter described.

To prepare resins for varnishes in the wet way, I take Venice turpentine of a consistency admitting of stirring with a porcelain or glass spatula in a porcelain basin, (should it be too thick it may be thinned with a little oil of turpentine,) or I make artificially a similar substance by dissolving colophony in about half its weight of oil of turpentine. With this viscid fluid I gradually incorporate by constant stirring and mixing a quantity of nitric acid, preferably drop by drop, keeping the mixture cool (for the temperature always rises on account of the chemical action) either by adding only a small percentage of nitric acid at one time or by cooling the basin by immersion in cold water. The temperature is thus prevented from rising considerably in any part of the mixture in such a way as to produce spontaneous decomposition before complete and uniform nitrification of the turpentine or colophony has taken place. The proportion of nitric acid added depends on the qualities of the varnish desired and the nature of the substances dealt with. For soft varnish which will dry slowly the nitric acid is restricted to about ten parts of acid to one hundred parts of the colophony or Venice turpentine. For varnish of a harder and more siccative quality the nitric acid is increased to about thirty to thirty-five parts. Colophony is more quickly nitrified than Venice turpentine and this latter substance than oil of turpentine, (of which only a part is capable of being transformed into a resin.) Consequently when colophony is dissolved in oil of turpentine and treated with nitric acid the result varies according to the length of time allowed for nitrification, (before decomposition.) To restrict the action principally to the colophony, only an hour or two are allowed to elapse between the mixing of the nitric acid and decomposition. If the oil of turpentine is to form part of the resin of the resulting varnish, several days are allowed before decomposing the nitrocompound. With Venice turpentine (which consists of various hydrocarbons or their oxids, some of which are volatile, the others not, some being attacked more quickly by nitric acid than others) procedure is the same. From oil of turpentine alone it is possible to make varnishes when several days are allowed for nitrification. With lengthened nitrification it is preferable to divide the nitric acid into successive portions. When several days have been allowed for nitrification, the residual water of the nitric acid generally separates from the viscous (often nearly solid) nitrocompound. It is advisable to remove this water before decomposition, as the practical absence of water tends to cause the oxidation process to take place more quietly. A dark-brown color signifies a satisfactory stage of nitrification. Decomposition may then proceed, preferably, in small quantities at a time, because a certain temperature near the boiling-point of water is necessary to cause decomposition. When this commences, the heat generated by chemical action is so considerable that if the quantity decomposed at one time be large the decomposition proceeds with accelerated speed owing to the increasing temperature. (The nitro compound is, in fact, a mild explosive.) The steam and gas generated escape with difficulty from the viscid mass, which froths and swells so much that even a basin of five or six times the capacity of the volume of the nitro compound is often not sufficient for retention. Great precaution is necessary if the whole be decomposed at one time. By placing another porcelain basin of equal capacity over a boiling-water bath and by transferring into this small successive portions of the nitro compound the whole may be safely decomposed. Then the resulting resin may be stirred for half an hour or an hour to complete the reaction and to drive off any residual water, volatile organic acid, or gas. The resin is then ready for admixture of oil of turpentine or of boiled oil and subsequent dilution with oil of turpentine in the usual way. These resins have all a pale-yellow color of transmission and a light-red or copper-colored refraction. They may be called "oxyturpentines" or "oxycolophones." To carry the process of oxidation further than is practicable by one operation of nitrification and decomposition, (it is not generally practicable to use economically more than about thirty parts of nitric acid to one hundred parts of colophony or of turpentine capable of forming resin,) a further process of the same character is necessary. The resin formed from the first process may either be pulverized and treated in the dry way or, preferably, is again dissolved in sufficient oil of turpentine to allow of stirring and mixing. (Part of this oil of turpentine, recently added, will be nitrified and oxidized, together with the resin dissolved in it.) This viscous fluid can then be nitrified as before. The process of nitrification and decomposition can be repeated until the desired extent of oxidation has been attained. To transform these oxyturpentines or oxycolophones into resins of a darker color and of harder and more siccative quality, they are subjected to the action of heat. Before doing so it is generally convenient to add either oil of turpentine or boiled oil to render the resin more fluid and more capable of convection and conduction. To attain a shade of brown, the resinous fluid so produced is heated in a glass flask or retort (if diluted with oil of turpentine) or in a porcelain basin (if with boiled oil) on a sand-bath or other suitable apparatus capable of communicating a gentle heat above 212° Fahrenheit, (100° centigrade,) but not exceeding 400° Fahrenheit, (200° centigrade,) keeping the fluid well stirred, the color indicating when the heating has been sufficient. Experience and practice are requisite for definite results. To produce varnishes of an orange or red tint, the resinous fluid is exposed for several hours, with occasional mixing or stirring, to the action of a water or steam bath or water-oven or similar apparatus by which the temperature can be constantly maintained at 212° Fahrenheit, (100° centigrade.) The extent of the nitrification (consequent oxidation) has a material influence on the effect produced by such subsequent heating. The larger the proportion of nitric acid used, other conditions being equal, the deeper will be the color of the varnish produced. During such heating or dehydration the fluid again bubbles or froths to a small extent, (especially when stirred,) owing to the emission of vapor, (principally steam.) When such frothing ceases, the maximum effect of heat has been attained.

For oxyturpentines and oxycolophones addition of boiled oil in making varnish affects the quality of the pellicle, (increasing cohesion and durability;) but when the oxyresin has been to any considerable extent dehydrated the addition of boiled oil to the resin is a necessity for its solution. In most cases it is no longer entirely capable of solution in oil of turpentine. In consequence of this when the oxyresin has been diluted with oil of turpentine only and has reached a certain point of dehydration precipitation of resin begins, thus defining the limit of a simple turpentine varnish.

The preparation of oil-varnishes from the oxyturpentines or oxycolophones is a comparatively simple matter, (as is the case with the natural soft resins.) If the extent of the oxidation has been moderate, (it will be obvious that although these products of oxidation are spoken of as "oxyturpentines" and "oxycolophones" a certain amount of dehydration is inevitable, owing to the heat to which they have been unavoidably exposed,) the resulting resin is completely and easily soluble in oil of turpentine. The proportion of boiled oil added is dictated by considerations apart from the question of solution. Less than fifty parts of oil to one hundred parts of the original colophony or turpentine is generally sufficient. When these oxyturpentines are dehydrated, the completion of the varnish requires experience. The proportion of boiled oil is governed by solubility. Increased dehydration entails an increase of oil. Moreover, when the minimum proportion of oil is used the proportion of oil of turpentine in the final dilution of the varnish is defined within narrow limits. If too much dilution takes place, the varnish on cooling becomes turbid and precipitates a part of its solid constituents. Brilliancy and refractive powers of varnishes being mainly attributable to the turpentine derivatives, it is desirable to restrict the proportion of oil to a quantity nearly approaching the minimum which is consistent with the constitution of the varnish. Oil-varnishes from these dehydrated oxyturpentines when finished and cooled if found too thick cannot be successfully subsequently diluted by reheating and further addition of oil of turpentine; but varnishes made from the same resin can when cold be mixed when the one is too thick and the other too thin. In diluting such varnishes with oil of turpentine it is generally necessary to raise it to near the temperature of the varnish before admixture.

A method of preparation of varnishes in which raw oil may be used, avoiding the separate preparation of boiled oil, as well as producing different shades of color, also a mode of production of varnishes of depth and shades of color which are not obtainable by the other processes described is attained by the following application of the described methods of uniform nitrification, decomposition, (together producing oxidation,) and dehydration to drying-oils: The oil when oxidized or oxidized and dehydrated plays two parts. First, it influences the quality of the varnish, (like boiled oil;) second, it affects its color. In order to conserve the first attribute, the proportion of nitric acid to oil is restricted to about ten per cent. For the second purpose the acid may be considerably increased.

The following is a method of preparing a varnish in which the oil plays a dual role: Take one hundred parts of colophony or Venice turpentine. Dissolve them in about fifty parts of raw drying-oil (heat of a water-bath) in a porcelain basin. When cool, this solution is nitrified with from ten to fifteen parts of nitric acid. For decomposition and subsequent dehydration either a water-bath or a sand-bath may be used, because this solution is capable of uniform heating with greater facility than the substances hitherto described. When decomposition takes place, the swelling of the mass is even greater than in the case of the turpentine. The precautions already suggested should therefore be taken. After decomposition the heat of the sand-bath may be cautiously continued until the varnish assumes a deep-brown color, or it may be heated for some hours over a water-bath, then diluted with oil of turpentine.

There are two alternative methods of producing varnishes of a deeper color than those whose preparation has been described. First, some raw oil is used as a solvent of the turpentine. This solution is nitrified, decomposed, and dehydrated to the extent necessary to produce the desired color. A quantity of boiled oil is added and the varnish diluted with oil of turpentine. Second, some raw oil is nitrified, (fifteen per cent. or upward nitric acid,) decomposed in a vessel apart, (for a coloring-oil.) A quantity of turpentine is nitrified and decomposed in another vessel. When the oxidation reaction is complete, the raw oil, separately oxidized, is added and also a quantity of boiled oil. This mixture is then subjected to dehydration in a water-oven or over a water-bath and finally diluted with oil of turpentine.

The boiled oil prescribed may either be prepared in the ordinary way or it may be prepared by my process by nitrification with about ten per cent. of nitric acid and subsequent decomposition.

The oxyturpentines, oxycolophones, and their dehydrated forms being soluble in aqueous alcohol of ninety per cent. and upward, spirit varnishes may be may be made from them in the usual way.

I am aware that nitric acid of varying degrees of concentration has been used or suggested by chemists and others as an oxidant of mineral and vegetable hydrocarbons and oils, with and without heat, the reactions being carried on with more or less violence, with a view to the production of resins and organic acids; but the products of such processes are not suitable for my present purposes, because the affinity of nitric acid for or its action on colophony, the various constituents of turpentine and drying-oils, is not equal; further, when these substances have been once oxidized their affinity for nitric acid increases. Hence if any of these substances be treated with nitric acid under conditions which cause a speedy reaction the nitric acid will act selectively on the substances first attacked, while others may more or less escape oxidation. The result will be products of varying degrees of oxidation unsuitable for the production of varnishes of the high quality which it is my aim to produce. For these reasons I have constantly emphasized the necessity for taking effective means to insure as a first step as complete and uniform nitrification as possible before oxidation is caused by decomposition of the nitro compound. Colors (distinct from those of oxidation) have been suggested as indicators of the progress of nitrification, for which time and temperature are important factors.

I am also aware that it is known that the colors of resinous substances are deepened by heat. I have stated the various conditions (of oxidation, intensity, and duration of heat and its mode of application) to enable the operator to obtain definite results for the purpose in view.

Having thus described the invention, what I claim is—

1. The production of resinous substances, suitable for the manufacture of varnishes, by the oxidation of vegetable hydrocarbons through their nitrification with nitric acid, and the subsequent decomposition of the nitro compound so formed.

2. The production of resinous substances, suitable for the manufacture of varnishes, by the oxidation of the lower oxids of vegetable hydrocarbons through their nitrification with nitric acid, and the subsequent decomposition of the nitro compounds so formed.

3. The production of resinous substances suitable for the manufacture of varnishes, by the oxidation of colophony through its nitrification with nitric acid and the subsequent decomposition of the nitro compounds so formed.

4. The production of resinous substances, suitable for the manufacture of varnishes, by the oxidation of mixtures of vegetable hydrocarbons, their lower oxids and colophony through the nitrification of such mixtures with nitric acid and the subsequent decomposition of the nitro compounds so formed.

5. The production of oleo-resinous substances, suitable for the manufacture of varnishes, by the oxidation of solutions composed of vegetable hydrocarbons dissolved in drying-oil, through the nitrification of such solutions with nitric acid and the subsequent decomposition of the nitro compounds so formed.

6. The production of oleo-resinous substances, suitable for the manufacture of varnishes, by the oxidation of solutions composed of the lower oxids of vegetable hydrocarbon dissolved in drying-oil, through the nitrification of such solutions with nitric acid and the subsequent decomposition of the nitro compounds so formed.

7. The production of oleo-resinous substances, suitable for the manufacture of varnishes by the oxidation of solutions composed of colophony dissolved in drying-oil through the nitrification of such solution with nitric acid, and the subsequent decomposition of the nitro compounds so formed.

8. The production of oleo-resinous substances, suitable for the manufacture of varnishes by the oxidation of solutions composed of mixtures of vegetable hydrocarbons, their lower oxids and colophony, dissolved in drying-oil through the nitrification of such solutions with nitric acid and the subsequent decomposition of the nitro compounds so formed.

9. The production of self-colored varnishes, of shades of orange and red, consisting of solutions of substances resulting from the action of a temperature approximating 212° Fahrenheit on resinous substances produced from vegetable hydrocarbons, from the lower oxids of such hydrocarbons, from colophony, and from mixtures of these substances by their oxidation through nitrification with nitric acid, and the subsequent decomposition of the nitro compounds so formed.

10. The production of self-colored varnishes from vegetable hydrocarbons with drying-oils, oxidized by means of nitric acid, decomposed, and modified by the action of regulated and controlled heat.

11. The production of self-colored varnishes, of shades of red and red brown, consisting of solutions of substances resulting from the action of a temperature approximating 212° Fahrenheit on oleo-resinous substances produced from solutions in drying-oil or vegetable hydrocarbons, of the lower oxids of such hydrocarbons, and of colophony, by the oxidation of such oil solutions through nitrification with nitric acid, and the subsequent decomposition of the nitro compounds so formed.

In testimony whereof I have hereunto set my hand in presence of two subscribing witnesses.

GEORGE FRY.

Witnesses:
ALEXANDER KIRKWOOD MAHINS,
WILLIAM ALLAN FAVERHILL.